United States Patent
Hakoda et al.

(10) Patent No.: US 8,168,097 B2
(45) Date of Patent: *May 1, 2012

(54) INJECTION MOLDING MACHINE AND METHOD OF CONTROLLING THE SAME

(75) Inventors: Takashi Hakoda, Nagano-ken (JP);
Toshimi Kato, Nagano-ken (JP);
Yoshimoto Unno, Nagano-ken (JP);
Hirofumi Murata, Nagano-ken (JP);
Kiyoshi Nakamura, Nagano-ken (JP)

(73) Assignee: Nissei Plastic Industrial Co., Ltd., Hanishina-Gun, Nagano-Ken (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/395,029

(22) Filed: Feb. 27, 2009

(65) Prior Publication Data

US 2009/0218710 A1    Sep. 3, 2009

(30) Foreign Application Priority Data

Feb. 29, 2008   (JP) .................................. 2008-051109

(51) Int. Cl.
*B29C 45/77*   (2006.01)

(52) U.S. Cl. .................. 264/40.5; 425/149; 425/567

(58) Field of Classification Search .............. 425/149, 425/567; 264/40.5
See application file for complete search history.

(56) References Cited

U.S. PATENT DOCUMENTS

| | | | |
|---|---|---|---|
| 5,514,311 A * | 5/1996 | Shimizu et al. | 264/40.1 |
| 5,518,390 A * | 5/1996 | Nakamura et al. | 425/145 |
| 5,518,671 A * | 5/1996 | Takizawa et al. | 264/40.1 |
| 5,533,884 A * | 7/1996 | Nakamura et al. | 425/145 |
| 5,540,577 A * | 7/1996 | Ishikawa et al. | 425/150 |
| 5,553,481 A * | 9/1996 | Arai | 73/1.66 |
| 7,824,164 B2 * | 11/2010 | Hakoda et al. | 425/145 |
| 2007/0054007 A1 * | 3/2007 | Yamaura et al. | 425/587 |

FOREIGN PATENT DOCUMENTS

| | | | |
|---|---|---|---|
| JP | 4-79289 A | | 3/1992 |
| JP | 06155534 | * | 6/1994 |
| JP | 2004-50427 A | | 2/2004 |

OTHER PUBLICATIONS

Machine Translation of the description of JP06-155534.*
Partial English translation of JP-04-79289.
Partial English-translation of JP-2004-50427.

* cited by examiner

*Primary Examiner* — Maria Veronica Ewald
*Assistant Examiner* — Robert J Grun
(74) *Attorney, Agent, or Firm* — Birch, Stewart, Kolasch & Birch, LLP

(57) ABSTRACT

An injection molding machine 1 includes mode selection means 8 that can selectively switch between a first control mode M1 and a second control mode M2. In the first control mode M1, control is performed by a first control system Cf in which a screw speed is controlled by feedback with a speed detection value Vd that is detected by screw speed detection means 5 and a speed target value Vfc, and an injection pressure is controlled by feedback with a pressure detection value Pid that is detected by injection pressure detection means 6 and a pressure target value Pic, whereas, in the second control mode M2, control is performed by a second control system Cs in which the screw speed is open-loop controlled with a speed target value Vsc, and a pump pressure is controlled by feedback with a pressure detection value Ppd that is detected by pump pressure detection means 7 and that is related to the pump pressure of the hydraulic pump 4 and a pressure target value Ppc.

14 Claims, 7 Drawing Sheets

INJECTION MOLDING MACHINE AND METHOD OF CONTROLLING THE SAME

TECHNICAL FIELD

The present invention relates to an injection molding machine provided with a hydraulic drive source incorporating a hydraulic pump that variably controls the number of rotations of a drive motor to achieve the control of a discharge flow rate and a method of controlling such an injection molding machine.

BACKGROUND ART

Generally, injection molding machines incorporating an injection device and a mold clamping device are widely known as disclosed in JP-A-H04-79289 (patent document 1) and other documents. In this type of injection molding machine, typically, molding materials such as pellets are fed from the hopper of the injection molding machine into a heating cylinder, are plasticized and melted with a rotating screw in the heating cylinder and are measured, and then the molten resin measured through the forward movement of the screw is injected and filled into a cavity of the mold that is clamped by the mold clamping device. In this case, in order for the molding quality to be enhanced, the speed of the screw is controlled by feedback, and injection pressure (resin pressure) is also controlled by feedback. Thus, the amount of resin filled into the cavity of the mold is kept constant, and molding failures are avoided such as short shots due to insufficient filling and flash due to overfilling.

Incidentally, when attention is focused on molding materials, a variety of molding materials have become available, and special attention is given to recycle materials that are designed to be recycled. Recycle materials are obtained by mixing normal molding materials (virgin materials) with waste plastics, waste materials or the like (different types of materials), and thus, as a larger amount of different types of materials are mixed with virgin materials, recyclability is enhanced. However, since these different types of materials are likely to be solid materials such as grained materials, the evenness of a molding material as a whole is reduced. Therefore, when injection molding is conventionally controlled by feedback, it occurs that the property of the molding material (unevenness of the molding material) affects the molding quality more significantly than the control by the molding machine does. Hence, conventional injection molding machines encounter difficulties in molding recycle materials satisfactorily, and this problem becomes apparent as a larger amount of different types of materials are included.

An injection molding machine specialized for recycle materials is known by the disclosure of JP-A-2004-50427 (patent document 2). The injection molding machine for recycle materials disclosed in patent document 2 is composed of an injection-plunger-equipped injection device, a plasticization-screw-equipped plasticizing device that is disposed adjacent to the injection device and a distribution device that communicates with an injection cylinder and that is disposed in front of a plasticization cylinder. This injection molding machine is configured such that the distribution device and the plasticization cylinder are connected together via a foreign-material-removing device having a filter of a metal net inside it, and foreign materials in plasticized resin are removed by the filter and the resin can be fed to the injection device.

SUMMARY OF INVENTION

Technical Problem

However, the above-described conventional injection molding machine (the injection molding machine for recycle materials) has the following problems to be solved.

First, the conventional injection molding machine is configured as an injection molding machine for recycle materials, and this causes it to have a peculiar and complicated configuration, with the result that the cost is increased. Moreover, when the conventional injection molding machine is used as an injection molding machine for molding only virgin material, extra mechanisms (functions) added to it contributes to reduced molding quality. Hence, when both virgin materials and recycle materials are molded, it is necessary to, for example, purchase two types of injection molding machines, and consequently the conventional injection molding machine suffers disadvantages in cost, installation space and the like.

Secondary, since the conventional injection molding machine basically and primarily has the function of removing foreign materials, the foreign material that is removed is only foreign materials removed by the foreign-material-removing device. Molding materials, such as recycle materials, that inevitably contain different types of materials inherently include foreign materials unnecessary to be removed and various materials that cannot be removed by the foreign-material-removing device, such as materials having different melting points and materials that generate gases by chemical reaction. This imposes restrictions on improvements in the unevenness of molding materials and enhancements in molding quality and the evenness of molding materials.

Solution to Problem

To overcome the above-described problems, according to one aspect of the present invention, there is provided an injection molding machine 1 provided with a hydraulic drive source 2 incorporating a hydraulic pump 4 that variably controls the number of rotations of a drive motor 3 to achieve control of a discharge flow rate, the injection molding machine 1 including mode selection means 8 that can selectively switch between a first control mode M1 and a second control mode M2. In the injection molding machine 1, in the first control mode M1, control is performed by a first control system Cf in which a screw speed is controlled by feedback with a speed detection value Vd that is detected by screw speed detection means 5 and that is related to the screw speed and a speed target value Vfc that is set, and an injection pressure is controlled by feedback with a pressure detection value Pid that is detected by injection pressure detection means 6 and that is related to the injection pressure and a pressure target value Pic that is set, whereas, in the second control mode M2, control is performed by a second control system Cs in which the screw speed is open-loop controlled with a speed target value Vsc that is set, and a pump pressure is controlled by feedback with a pressure detection value Ppd that is detected by pump pressure detection means 7 and that is related to the pump pressure of the hydraulic pump 4 and a pressure target value Ppc that is set.

To overcome the above-described problems, according to another aspect of the present invention, there is provided a method of controlling an injection molding machine 1 provided with a hydraulic drive source 2 incorporating a hydraulic pump 4 that variably controls the number of rotations of a drive motor 3 to achieve control of a discharge flow rate. In the method, selectable first control mode M1 and second control mode M2 are provided, and, if the first control mode M1 is selected, control is performed by a first control system Cf in which a screw speed is controlled by feedback with a speed detection value Vd related to the screw speed that is detected and a speed target value Vfc that is set, and an injection pressure is controlled by feedback with a pressure detection value Pid related to the injection pressure that is detected and a pressure target value Pic that is set, whereas, if the second control mode M2 is selected, control is performed by a second control system Cs in which the screw speed is open-loop controlled with a speed target value Vsc that is set, and a pump pressure is controlled by feedback with a pressure detection value Ppd related to the detected pump pressure of the hydraulic pump 4 and a pressure target value Ppc that is set.

ADVANTAGEOUS EFFECTS OF INVENTION

With the injection molding machine 1 and the controlling method thereof according to the present invention, the following remarkable benefits are obtained.

(1) Since the first control mode M1 and the second control mode M2 can be selected according to molding materials even if different types of molding materials (conditions) are used, it is possible to share a single injection molding machine 1 for molding operations for different types of molding materials. Thus, it is unnecessary to purchase two types of injection molding machines according to different types of molding materials, and this results in advantages in cost, installation space and the like, and the different types of molding materials are handled by change of the controlling methods. Hence, it is possible to prevent an injection molding machine itself from becoming specific and complicated, and this contributes to further reduction in cost.

(2) Since, even if molding materials contain different types of materials like recycle materials, optimum control is performed according to the property and condition of the molding materials that inevitably contain different types of materials, the molding quality and the evenness of the molding materials can be enhanced, even if the molding materials are uneven, irrespective of the degree of the unevenness. In particular, when the second control mode M2 is selected, overload is prevented. This contributes to improved energy saving in the injection molding machine as a whole.

(3) According to one preferred aspect, the servo gain Ks on the pump pressure in the second control system Cs is set lower than the servo gain Kf on the pump pressure in the first control system Cf. Thus, it is possible to make more apparent the advantage (property) of the second control system Cs in which the screw speed is open-loop controlled and the pump pressure is controlled by feedback.

(4) According to another preferred aspect, the injection pressure detection means 6 includes at least one of the nozzle resin pressure sensor 6a for detecting the pressure of resin (Pid) inside the injection nozzle 11 in the injection device 1i, the cylinder internal pressure sensor 6b for detecting the hydraulic pressure (Pid) inside the injection cylinder 12 and the mold resin pressure sensor 6c for detecting the pressure of resin (Pid) inside the mold 13. Thus, it is possible to select more preferable detection positions corresponding to operation processes, molding conditions and the like. This makes it possible to accurately perform control suitable for operation processes, molding conditions and the like.

(5) According to another preferred aspect, the minor loop control system Cm for the drive motor 3 is provided in which the number of rotations of the drive motor 3 is detected by the rotary encoder 14, and based on this detection result, the number of rotations is controlled by feedback. Thus, it is possible to stabilize the number of rotations of the drive motor 3 and furthermore the discharge flow rate and pump pressure of the hydraulic pump 4.

(6) According to another preferred aspect, when the manual selection means 8m that can manually and arbitrarily perform switching is used as the mode selection means 8, it is possible to select an optimum control mode by the decision of an operator.

(7) According to another preferred aspect, the first control mode M1 or second control mode M2 can be selected according to at least material information. Thus, it is possible to perform optimum control corresponding to different properties (conditions) of various molding materials.

(8) According to another preferred aspect, the material information includes at least information of a recycle material containing a virgin material and a predetermined proportion or more of a waste material, and the first control mode is selected for the virgin material and the second control mode is selected for the recycle material. Thus, it is possible to perform optimum control on virgin materials and recycle materials in particular.

DESCRIPTION OF EMBODIMENTS

A preferred embodiment of the present invention will now be described with reference to the accompanying drawings. The accompanying drawings do not limit the scope of the invention but facilitate the understanding of the invention. A detailed description of well-known portions will be omitted for the purpose of preventing the invention from being unclearly described.

The configuration of an injection molding machine 1 of this embodiment will first be specifically described with reference to FIGS. 2 to 5.

Figure 2:
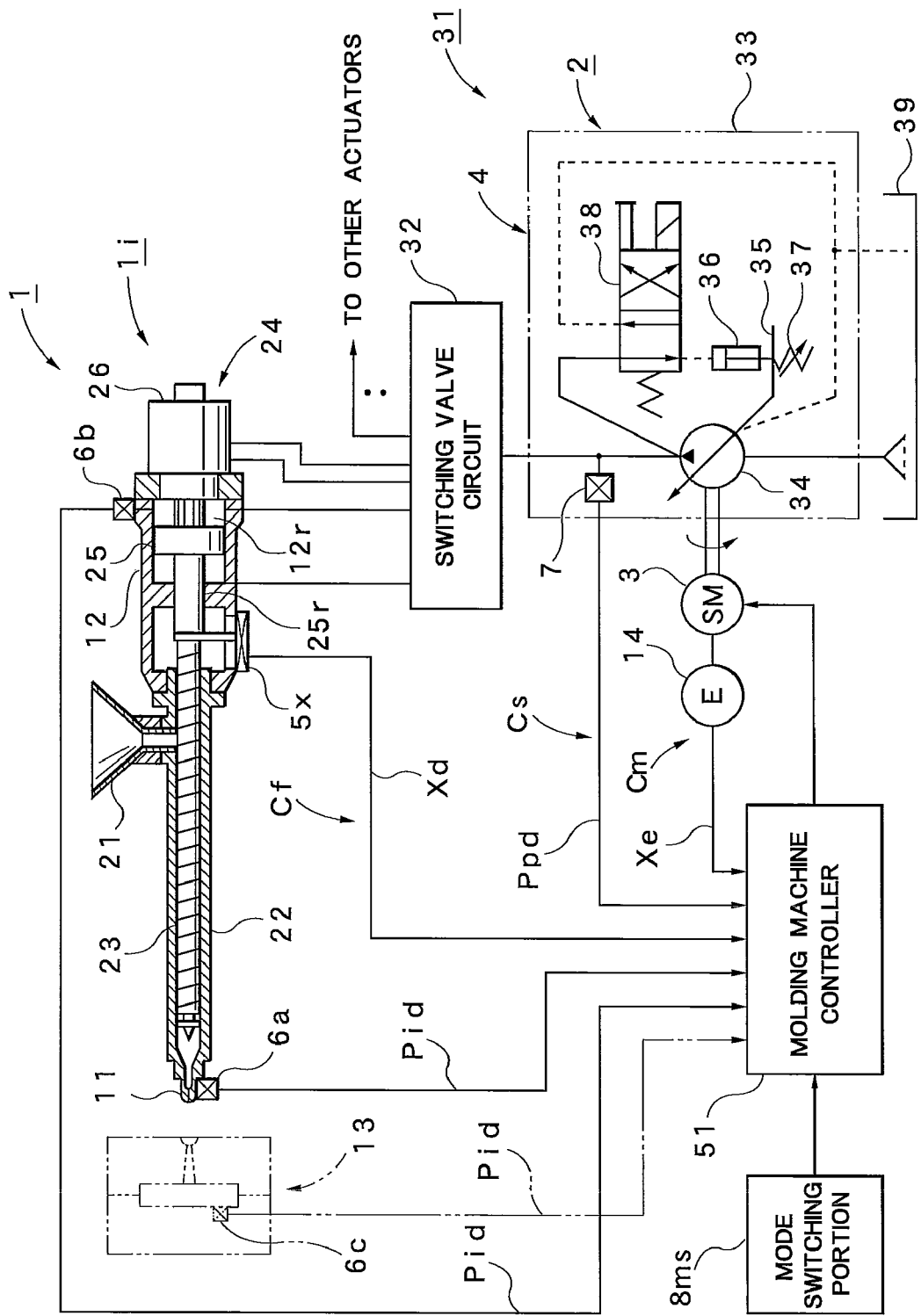
FIG. 2 is a diagram schematically showing the configuration of the injection molding machine.

In FIG. 2, the reference numeral 1 represents the injection molding machine; the injection molding machine has an injection device 1i and a mold clamping device. The mold clamping device is not shown, and a mold 13 supported by this mold clamping device is only shown. The injection device 1i includes a heating cylinder 22 that has an injection nozzle 11 at its front end and a hopper 21 on its back. A screw 23 is inserted into the heating cylinder 22, and a screw drive portion 24 is provided on the back end of the heating cylinder 22. The screw drive portion 24 has an injection cylinder (hydraulic cylinder) 12 incorporating a single-rod injection ram 25, and a ram rod 25r protruding forward of the injection ram 25 is coupled to the back end of the screw 23. The shaft of an oil motor 26 attached to the injection cylinder 12 is spline-coupled to the back end of the injection ram 25. The injection device 1i makes the injection nozzle 11 touch the mold 13, and this allows molten resin to be injected and filled into the cavity of the mold 13.

The reference numeral 31 represents a hydraulic drive portion; it has a hydraulic pump (variable discharge hydraulic pump) 4 serving as a hydraulic drive source 2 and a switching valve circuit 32. The hydraulic pump 4 has a pump portion 33 and a servo motor (drive motor) 3 for rotationally driving the pump portion 33. An alternating-current servo motor that is connected to the output port of a molding machine controller 51 is used as the servo motor 3, and a rotary encoder 14 for detecting the number of rotation of the servo motor 3 is additionally provided. This rotary encoder 14 is connected to the input port of the molding machine controller 51.

The pump portion 33 incorporates a pump body 34 configured with an inclined-plate piston pump. Thus, the pump portion 33 has an inclined plate 35. When the inclination angle (inclined plate angle) of the inclined plate 35 is increased, the stroke of a pump piston in the pump body 34 is increased and a discharge flow rate is increased; when the inclination angle is decreased, the stroke of the pump piston is decreased and the discharge flow rate is decreased. Thus, by setting the inclined plate angle at a predetermined angle, it is possible to set a fixed discharge flow rate at which the discharge flow rate is fixed at a predetermined level. The inclined plate 35 is additionally provided with a control cylinder 36 and a return spring 37, and the control cylinder 36 is connected to the discharge port of the pump portion 33 (pump body 34) through a switching valve (electromagnetic valve) 38. Thus, it is possible to vary the angle of the inclined plate 35 (inclined plate angle) by controlling the control cylinder 36.

The inlet of the pump portion 33 is connected to an oil tank 39, and the discharge port of the pump portion 33 is connected to the primary side of the switching valve circuit 32 and the secondary side of the switching valve circuit 32 is connected to the actuators of components including the injection cylinder 12 and the oil motor 26 in the injection molding machine 1, a mold clamping cylinder, a protrusion cylinder and an injection device transfer cylinder. Thus, the switching valve circuit 32 has switching valves (electromagnetic valves) each of which is connected to at least the actuators of the injection cylinder 12, the oil motor 26 and others. Each of the switching valves is composed of one or two or more valve components, necessary additional hydraulic components and other components, and has the function of switching at least the actuators of the injection cylinder 12, the oil motor 26 and others between the supply, the stop and the discharge of operating oil.

Thus, when the number of rotations of the servo motor 3 is variably controlled, the discharge flow rate and the pump pressure of the hydraulic pump 4 can be varied. Based on this, it is possible to control drive of the actuators of the injection cylinder 12, the oil motor 26 and others. When, as described above, a variable discharge hydraulic pump is used as the hydraulic pump 4, it is possible to more reliably and effectively achieve the control of this embodiment and especially a second control mode M2 (a second control system Cs) that will be described later.

Various sensors are additionally provided in the injection device 1i. Specifically, the injection device 1i has a screw position sensor 5x that detects the position of the screw 23 and that incorporates a linear encoder or the like, injection pressure detection means 6 for detecting a pressure detection value Pid on injection pressure and a pump pressure sensor (pump pressure detection means) 7 for detecting a pressure detection value Ppd on the pump pressure (discharge pressure) of the hydraulic pump 4. In this case, the injection pressure detection means 6 has a nozzle resin pressure sensor 6a for detecting the pressure of resin (Pid) inside the injection nozzle 11 in the injection device 1i and a cylinder internal pressure sensor 6b for detecting the hydraulic pressure (Pid) inside a rear oil compartment 12r in the injection cylinder 12. Instead of detecting the pressure of resin inside the injection nozzle 11 by the nozzle resin pressure sensor 6a, the pressure of resin inside the heating cylinder 22 may be detected or the pressure of resin inside the mold 13 may be detected by a mold resin pressure sensor 6c. The sensors 5x, 6a (6c), 6b and 7 are connected to the input port of the molding machine controller 51. When, as described above, the injection pressure detection means 6 includes at least one of the nozzle resin pressure sensor 6a for detecting the pressure of resin inside the injection nozzle 11 in the injection device 1i, the cylinder internal pressure sensor 6b for detecting the hydraulic pressure inside the injection cylinder 12 and the mold resin pressure sensor 6c for detecting the pressure of resin inside the mold 13, more preferable detection positions corresponding to operation processes, molding conditions and the like can be selected. Thus, it is possible to accurately perform control suitable for operation processes, molding conditions and the like.

Figure 3:
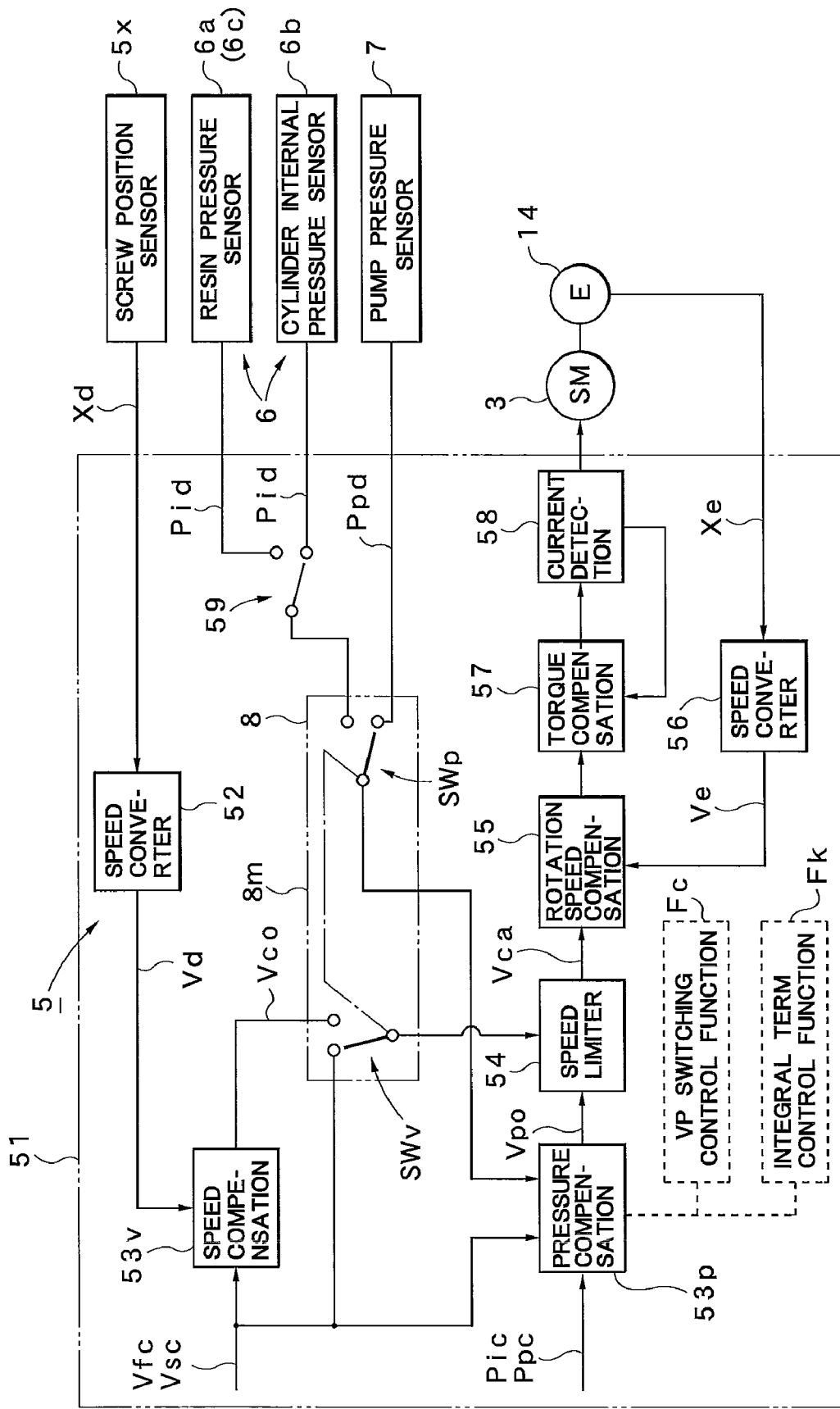
FIG. 3 is a block system diagram showing the main portions of the injection molding machine.

FIG. 3 is a block system diagram showing the main portions of the molding machine controller 51. In FIG. 3, the reference numeral 52 represents a speed converter; the reference numeral 53v represents a speed compensation portion; the reference numeral 53p represents a pressure compensation portion; the reference numeral 54 represents a speed limiter; the reference numeral 55 represents a rotation speed compensation portion; the reference numeral 56 represents a speed converter; the reference numeral 57 represents a torque compensation portion; the reference numeral 58 represents a current detector; and the reference numeral 59 represents a switch.

The reference numeral 8 represents mode selection means; the mode selection means uses manual selection means 8m that can be switched manually. Thus, the manual selection means 8m has a speed-selection switch SWv and a pressure-selection switch SWp shown in FIG. 3 and mode switching portion 8ms that is shown in FIG. 2 and that switches between the speed-selection-switch function portion SWv and the pressure-selection-switch function portion SWp in a coordinating manner. This mode switching portion 8ms is a manual operation portion; a touch-panel selection key displayed on the display of the molding machine controller 51 or the like can be used. Thus, an operator operates the mode switching portion 8ms manually to allow the speed-selection-switch function portion SWv and the pressure-selection-switch function portion SWp to be switched simultaneously and to allow the first and second control modes M1 and M2 described later to be selected arbitrarily. That is, the optimum control mode can be selected by the decision of the operator.

As shown in FIG. 3, the above-described pump pressure sensor 7 is connected to the pressure-selection-switch function portion SWp, and the above-described resin pressure sensor 6a (6c) and cylinder internal pressure sensor 6b are connected via the switch 59 to the pressure-selection-switch function portion SWp. Thus, pressure detection values Pid and Ppd obtained from the cylinder internal pressure sensor 6b (resin pressure sensor 6a (6c)) and the pump pressure sensor 7 are selected by the pressure-selection-switch function portion SWp, and are fed to the pressure compensation portion 53p. The above-described screw position sensor 5x is connected to the speed converter 52. Thus, a position detection value Xd obtained from the screw position sensor 5x is converted, by the speed converter 52, into a speed detection value Vd, and is fed to the speed compensation portion 53v. Therefore, the screw position sensor 5x and the speed converter 52 constitute screw speed detection means 5 that detects a position detection value Vd on the screw speed. A rotation number detection value Xe obtained from the rotary encoder 14 is converted into a rotation number detection value Ve by the speed converter 56, and is fed to the rotation speed compensation portion 55. In this way, a minor loop control system Cm for the servo motor 3 is formed, and the number of rotations (rotation speed) of the servo motor 3 is controlled by feedback. Thus, it is possible to stabilize the number of rotations of the servo motor 3 and furthermore the discharge flow rate and the pump pressure of the hydraulic pump 4.

Predetermined speed target values (speed set values) Vfc and Vsc are fed to the speed compensation portion 53v, and predetermined pressure target values (pressure set values) Pic and Ppc are fed to the pressure compensation portion 53p. This pressure compensation portion 53p has a VP switching control function portion Fc and an integral term control function portion Fk that will be described later. The speed target values Vfc and Vsc are also fed to the speed-selection-switch function portion SWv and the pressure compensation portion 53p. A speed command value Vco or a speed target value Vs output from the speed compensation portion 53v is selected by the speed-selection-switch function portion SWv, is fed to the speed limiter 54 and is set as a speed limit value. A speed command value Vpo that is output from the pressure compensation portion 53p and that is pressure-compensated is also fed to the speed limiter 54. A speed command value Vca output from the speed limiter 54 is fed to the rotation speed compensation portion 55. A torque command value output from the rotation speed compensation portion 55 is fed to the torque compensation portion 57. A motor drive current output from the torque compensation portion 57 is fed to the servo motor 3 to drive the servo motor 3. The magnitude of the motor drive current is detected by the current detector 58, and is fed to the torque compensation portion 57. Thus, the motor drive current is controlled by feedback on a minor loop.

Figure 4:
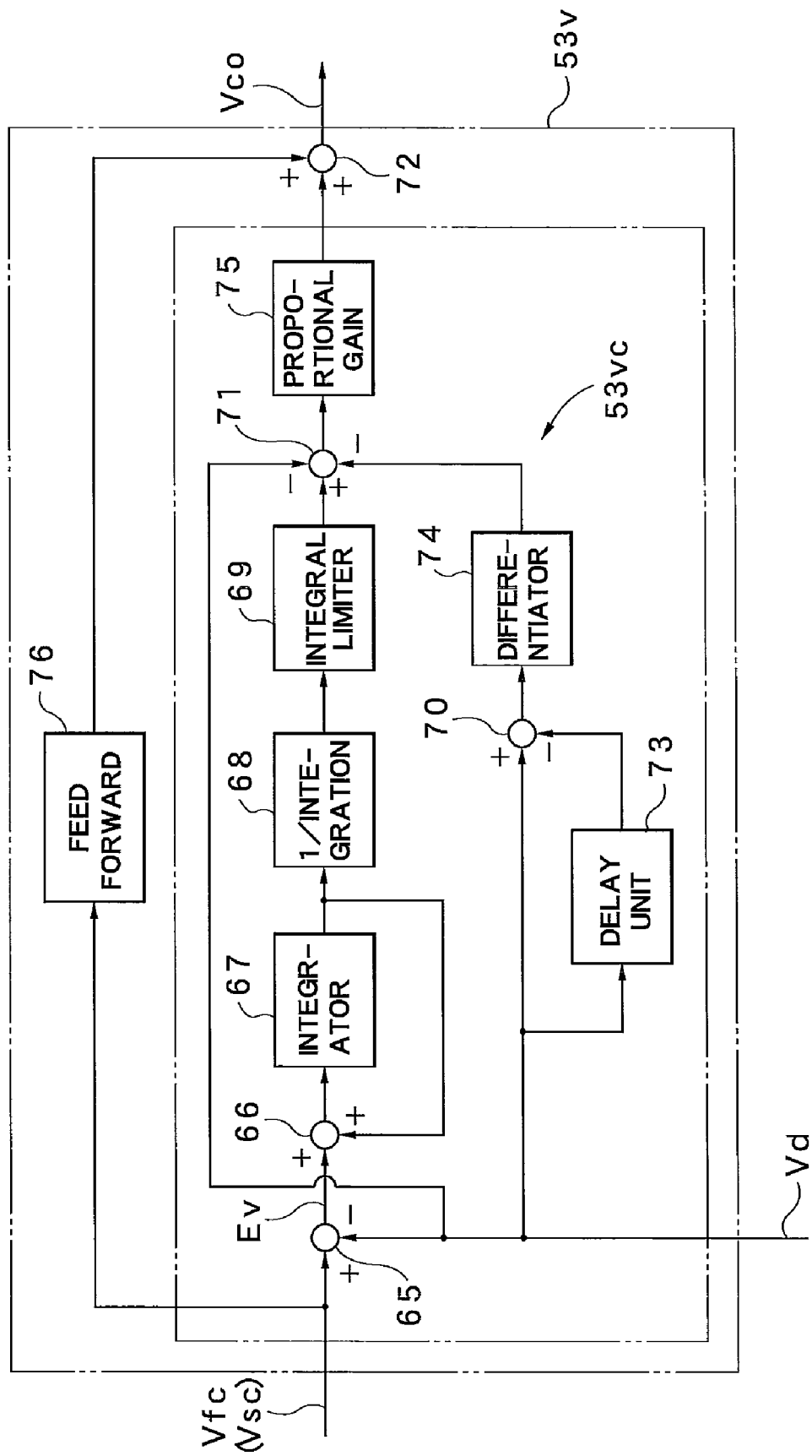
FIG. 4 is a block system diagram showing a speed compensation portion of the injection molding machine.
Figure 5:
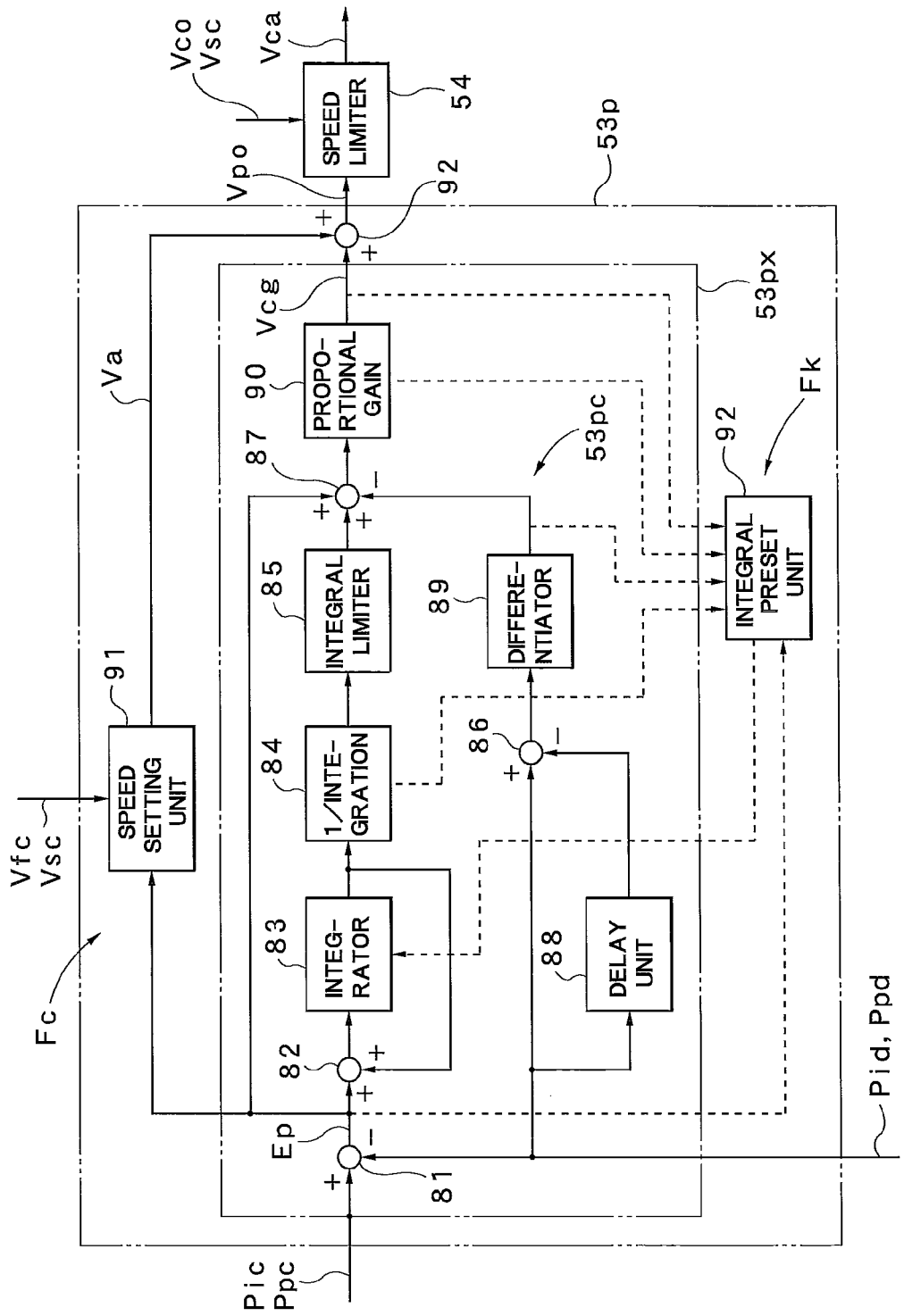
FIG. 5 is a block system diagram showing a pressure compensation portion of the injection molding machine.

In FIG. 4, a block system diagram of the above-described speed compensation portion 53v is specifically shown; in FIG. 5, a block system diagram of the above-described pressure compensation portion 53p is specifically shown.

The speed compensation portion 53v shown in FIG. 4 is broadly composed of a deviation arithmetic unit 65 and a PID control system 53vc. This PID control system 53vc includes an adder 66, an integrator 67, an arithmetic unit 68 that outputs 1/an integral value, an integral limiter 69, a subtractor 70, an adder-subtractor 71, an adder 72, a delay unit 73, a differentiator 74, a proportional gain setting unit 75 and a feed forward circuit 76. Thus, in the speed compensation portion 53v, a deviation between the speed target value Vfc and the speed detection value Vd, namely, a speed deviation value Ev is obtained from the deviation arithmetic unit 65, this speed deviation value Ev is speed-compensated by the PID control system 53vc and thus the speed command value Vco is obtained and this speed command value Vco is fed as an output of the speed compensation portion 53v to the speed-selection-switch function portion SWv. In the PID control system 53vc, I-PD control is performed. Since the injection molding machine 1 of this embodiment includes a hydraulic circuit having a relatively slow response to the speed feedback control system, such I-PD control is suitable. This advantageously allows easy adjustment of the control system and cost reduction.

In the pressure compensation portion 53p shown in FIG. 5, a basic circuit 53px is broadly composed of a deviation arithmetic unit 81 and a PID control system 53pc. This PID control system 53pc includes an adder 82, an integrator 83, an arithmetic unit 84 that outputs 1/an integral value, an integral limiter 85, a subtractor 86, an adder-subtractor 87, a delay unit 88, a differentiator 89 and a proportional gain setting unit 90. Thus, in the basic circuit 53px, a deviation between the pressure target value Pic and the pressure detection value Pid or a deviation between the pressure target value Ppc and the pressure detection value Ppd, namely, a pressure deviation value Ep is obtained from the deviation arithmetic unit 81, and this pressure deviation value Ep is pressure-compensated by the PID control system 53pc and thus a speed command value Vcg is obtained. This speed command value Vcg is output from the basic circuit 53px. In the PID control system 53pc, PI-D control is performed. Since the injection molding machine 1 of this embodiment includes a hydraulic circuit having a relatively slow response to the pressure feedback control system, such PI-D control is suitable. This advantageously allows easy adjustment (encoding) of the control system and cost reduction.

The pressure compensation portion 53p has not only the basic circuit 53px but also a VP switching control function portion Fc and an integral term control function portion Fk. As the VP switching control function portion Fc, a speed setting unit 91 and an adder 92 connected between the proportional gain setting unit 90 and the speed limiter 54 are used. The pressure deviation value Ep output from the deviation arithmetic unit 81 and the above-described speed target value Vfc (Vsc) are input to the speed setting unit 91. In the speed setting unit 91, a predetermined control pattern that outputs a compensation command value Va corresponding to the pressure deviation value Ep is set. Thus, as an output of the speed setting unit 91, the compensation command value Va corresponding to the pressure deviation value Ep, namely, a compensation command value Va obtained by conversion of the speed target value Vfc (Vsc) to be input through the predetermined control pattern is obtained. This compensation command value Va is fed to the adder 92, where it is added to a speed command value Vcg obtained from the proportional gain setting unit 90, and a compensated speed command value Vpo obtained from the adder 92 is fed to the speed limiter 54. This VP switching control function portion Fc switches from a speed control region to a pressure control region when the pressure deviation value Ep reaches a predetermined switching determination value or less, and controls, at the time of such switching, a speed target value Vfc (Vsc) in the speed control region by the predetermined pattern and then transfers it into the pressure control region, with the result that it can perform control stably and more ideally. In particular, when pressure and speed are detected at a location away from an actually controlled object, pressure and speed detection values that are detected are so-called assumed values. Thus, when the speed control region is switched to the pressure control region, the predetermined switching determination value is inevitably set at an ample level. Therefore, with the pressure deviation value Ep set at a high level, switching on the feedback system is performed, and this results in both an unstable operation when switching is performed and significant variations in the operation. Accordingly, the speed is rapidly reduced. However, with the VP switching control function portion Fc, it is possible to eliminate these problems.

An integral preset unit 92 is used as the integral term control function portion Fk. This integral preset unit 92 performs, when the speed control region is switched to the pressure control region, an operation of presetting an integral term of the PID control system 53pc included in the pressure compensation portion 53p at a new integral term that is determined such that the speed command value Vcg after the switching agrees with the speed command value Vcg prior to the switching. Thus, an old speed command value Vcgr output from the proportional gain setting unit 90, an old proportional gain Gpr of the proportional gain setting unit 90, an old differential output Dr of the differentiator 89, a new pressure deviation value Ep and a new integral gain Gi obtained from the arithmetic unit 84 are fed to the integral preset unit 92, and a new integral term is obtained by performing arithmetic processing with equation (100) below.

$$\text{A new integral term} = \{(Vcr/Gpr) + Dr - Ep\} \cdot Gi \quad (100)$$

As described above, the new integral term is determined by performing, with equation (100), an inverse calculation on the old speed command value Vcgr prior to the switching, and the new integral term, that is, the arithmetic result (solution) is preset into the integrator 83. As a result, when the speed control region is switched to the pressure control region, the speed command value Vcg after the switching agrees with the speed command value Vcg prior to the switching. In this case, the old speed command value Vcgr, the old proportional gain Gpr and the old differential output Dr are temporarily stored in the integral preset unit 92. By providing the integral term control function portion Fk that operates as described above, it is possible to prevent unstable variations, such as an overshoot or undershoot, that are generated by shocks caused when the speed control region is switched to the pressure control region.

A description will now be given of a control method according to this embodiment, including the operation of the injection molding machine 1 having such a configuration, especially an operation in an injection process, with reference to FIGS. 1 to 7.

Figure 6:
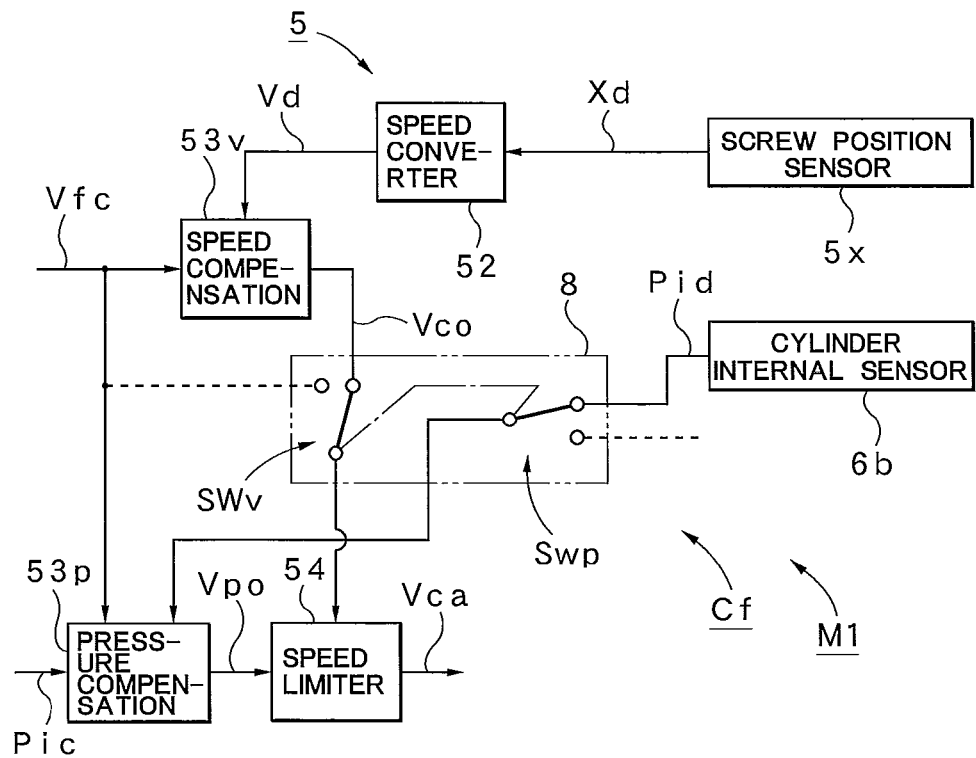
FIG. 6 is a block system diagram when a first control mode is selected in the injection molding machine.

In the injection molding machine 1, two control modes, namely, a first control mode M1 and a second control mode M2 are set. Here, the first control mode M1 is a mode using a first control system Cf in which, as shown in FIG. 6, a screw speed is controlled by feedback with the speed detection value Vd that is detected by the screw speed detection means 5 and that is related to the screw speed and the speed target value Vfc that is set, and in which an injection pressure is controlled by feedback with the pressure detection value Pid that is detected by the injection pressure detection means 6 and that is related to the injection pressure and the pressure target value Pic that is set. Thus, when the first control mode M1 is used, the speed-selection switch SWv and the pressure-selection switch SWp of the mode selection means 8 are switched to positions, shown in FIG. 6, that select the first control mode M1.

Figure 7:
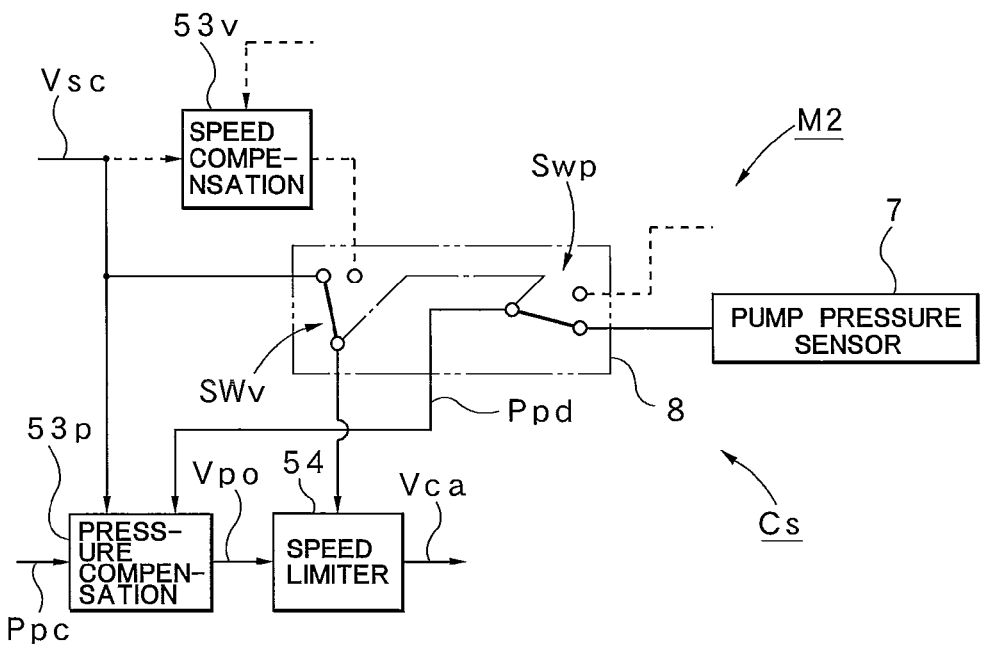
FIG. 7 is a block system diagram when a second control mode is selected in the injection molding machine.

In contrast, the second control mode M2 is a mode using a second control system Cs in which, as shown in FIG. 7, a screw speed is open-loop controlled with the speed target value Vsc that is set, and in which a pump pressure is controlled by feedback with the pressure detection value Ppd of the hydraulic pump 4 that is detected by the pump pressure sensor 7 and that is related to the pump pressure and the pressure target value Ppc that is set. Thus, when the second control mode M2 is used, the speed-selection switch SWv and the pressure-selection switch SWp of the mode selection means 8 are switched to positions, shown in FIG. 7, that select the second control mode M2. In the second control mode M2, a servo gain Ks on the pump pressure of the second control system Cs is set lower than a servo gain Kf on the pump pressure of the first control system Cf. The servo gain Kf can be set at a standard level. When the servo gain Ks of the second control system Cs is set lower than the servo gain Kf of the first control system Cf in this way, it is possible to make more apparent the advantage (property) of the second control system Cs in which the screw speed is open-loop controlled and the pump pressure is controlled by feedback.

Figure 1:
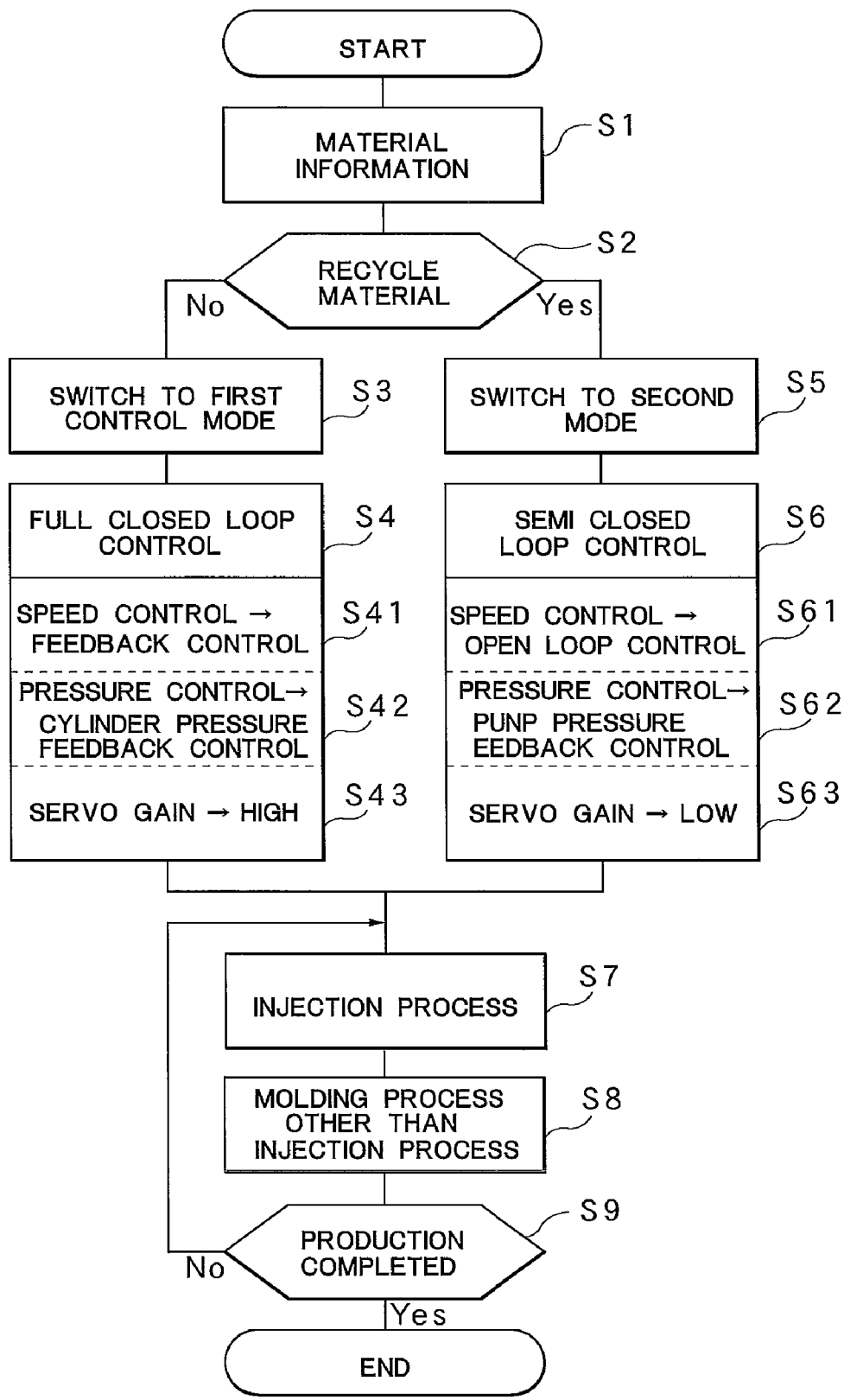
FIG. 1 is a flow chart showing how an injection molding machine according to a preferred embodiment of the present invention is controlled.

A description will now be given of operations in the injection process (an injection filling process and a pressure-holding process) using the first and second control modes M1 and M2 according to a flowchart shown in FIG. 1.

Before the start of production, an operator first selects between the first control mode M1 and the second control mode M2. Here, the first control mode M1 and the second control mode M2 can be selected according to at least material information (step S1). More preferably, when molding materials are normal molding materials (virgin materials), the first control mode M1 can be selected, and when molding materials are recycle materials containing a predetermined proportion of waste materials or more, the second control mode M2 can be selected. Thus, by selecting between the first control mode M1 and the second control mode M2, it is possible to perform an optimum control to suit different properties (conditions) of various molding materials. In particular, it is possible to perform an optimum control on virgin materials and recycle materials. The operator can manually operate the mode switching portion 8ms to select between the first control mode M1 and the second control mode M2.

It is now assumed that the operator selects the first control mode M1 to mold virgin materials (steps S2 and S3). Thus, in the injection process, a full closed loop control is performed (step S4). The full closed loop control is performed by the above-described first control system Cf in which, as shown in FIG. 6, a screw speed is controlled by feedback with the speed detection value Vd that is detected by the screw speed detection means 5 and that is related to the screw speed and the speed target value Vfc that is preset (step S41), and in which an injection pressure is controlled by feedback with the pressure detection value Pid that is detected by the cylinder internal pressure sensor 6b and that is related to the injection pressure and the pressure target value Pic that is preset (step S42). The servo gain Kf on the pump pressure is set relatively higher than the servo gain Ks on the pump pressure in the second control system Cs (step S43). Since the servo gain Ks of the second control system Cs is set lower than the standard one, the servo gain Kf can be set at the standard one.

Then, in the first control mode M1, the injection process is controlled in the production (step S7). In this case, in the injection filling process, the servo motor 3 is controlled to be driven by the molding machine controller 51, and a pressurized oil is fed into the rear oil compartment 12r in the injection cylinder 12 by the operation of the hydraulic pump 4. As a result of this, the molten resin (virgin material) inside the heating cylinder 22 that is measured is injected and filled into the cavity of the mold 13 via the injection nozzle 11 by the forward movement of the injection ram 25 and the screw 23. Here, the position detection value Xd obtained from the screw position sensor 5x is converted into the speed detection value Vd by the speed converter 52 and is fed to the deviation arithmetic unit 65. In the deviation arithmetic unit 65, the deviation between the speed target value Vfc and the speed detection value Vd, namely, the speed deviation value Ev is obtained, and the speed command value Vco obtained as a result of the speed deviation value Ev being speed-compensated by the PID control system 53vc is also obtained. This speed command value Vco is fed to the speed limiter 54 via the speed-selection-switch function portion SWv.

The pressure detection value Pid obtained from the cylinder internal pressure sensor 6b is fed to the deviation arithmetic unit 81 via the pressure-selection-switch function portion SWp. In the deviation arithmetic unit 81, the deviation between the pressure target value Pic and the pressure detection value Pid, namely, the pressure deviation value Ep is obtained, and the speed command value Vcg obtained as a result of the pressure deviation value Ep being pressure-compensated by the PID control system 53pc is obtained as an output of the proportional gain setting unit 90. In the adder 92, the speed command value Vcg and the compensation command value Va from the speed setting unit 91 are added together, and the resulting value is fed to the speed limiter 54. In the speed limiter 54, the speed command value Vco output from the speed compensation portion 53v is set as a speed limiter value. In the injection filling process, since the injection pressure (pressure detection value Pid) is low, the pressure deviation value Ep is high. Thus, the speed command value Vco, namely, the speed limiter value is output, as the speed command value Vca, from the speed limiter 54, and a screw speed is controlled by feedback such that the injection speed becomes the speed target value Vfc.

As the injection filling process proceeds, the injection pressure gradually increases, that is, the pressure detection value Pid gradually increases. Thus, the pressure deviation value Ep (speed command value Vcg) between the pressure target value Pic and the pressure detection value Pid decreases. When the speed command value Vcg becomes lower than the speed command value Vco, that is, the speed limiter value, the switching to the pressure control is substantially performed. Then, when the position detection value Xd obtained from the screw position sensor 5x reaches a predetermined position (VP switching position) or the pressure target value Pic (VP switching pressure), the process is transferred to the pressure-holding process. In the pressure-holding process (pressure control region), the pressure deviation value Ep (speed command value Vcg) is lower than the speed command value Vco, the speed command value Vcg obtained from the pressure compensation portion 53p is output, as the speed command value Vca, from the speed limiter 54 and a pressure is controlled by feedback such that the pressure detection value Pid is equal to the pressure target value Pic.

When control is performed in the first control mode M1 as described above, a screw speed is controlled by feedback so that the speed is controlled more precisely, and an injection pressure (resin pressure) is also controlled by feedback so that the pressure is controlled more precisely. Therefore, highly precise control on the molding machine is reflected on highly even virgin materials. This makes it possible to perform optimum control on the virgin materials. After the injection process is completed, molding processes other than the injection process are performed (steps S8 and S9). In the molding processes other than the injection process, the first control mode M1 is cancelled.

It is now assumed that the operator selects the second control mode M2 to mold recycle materials (step S5). Thus, in the injection process, semi closed loop control is performed (step S6). The semi closed loop control is performed by the above-described second control system Cs, and, as shown in FIG. 7, a screw speed is open-loop controlled with the set speed target value Vsc (step S61), and a pump pressure is controlled by feedback with the pressure detection value Ppd that is detected by the pump pressure sensor 7 and that is related to the pump pressure of the hydraulic pump 4 and the preset pressure target value Ppc (step S62). The servo gain Ks on the pump pressure in the second control system Cs is set lower than the servo gain Kf on the pump pressure in the first control system Cf (step S63).

Then, in the second control mode M2, the injection process is controlled in the production (step S7). In this case, in the injection filling process, the servo motor 3 is controlled to be driven by the molding machine controller 51, and a pressurized oil is fed into the rear oil compartment 12r in the injection cylinder 12 by the operation of the hydraulic pump 4. Then, the molten resin (recycle material) inside the heating cylinder 22 that is measured is injected and filled into the cavity of the mold 13 via the injection nozzle 11 by the forward movement of the injection ram 25 and the screw 23. In this case, the speed target value Vsc bypasses the speed compensation portion 53v, and is fed directly to the speed limiter 54, and a screw speed is open-loop controlled.

The pressure detection value Ppd that is obtained from the pump pressure sensor 7 and that is related to the pump pressure is fed to the deviation arithmetic unit 81 via the pressure-selection-switch function portion SWp. Thus, the pressure deviation value Ep between the pressure target value Ppc and the pressure detection value Ppd is obtained from the deviation arithmetic unit 81, and feedback control is performed such that the pump pressure (discharge pressure) of the hydraulic pump 4 is equal to the pressure target value Ppc. Therefore, highly precise and stable oil pressure is fed from the hydraulic drive source 2 to the rear oil compartment 12r in the injection cylinder 12. In consideration of recycle materials, the pressure target value Ppc is set so as not to cause a failure due to flash or the like.

When control is performed in the second control mode M2 as described above, a screw speed is open-loop controlled, and the pump pressure of the hydraulic pump 4 is so controlled by feedback that the pressure is controlled more precisely. Thus, even if recycle material is highly uneven, control is performed on the molding machine according to the property and condition of the recycle material. Specifically, since a screw speed is open-loop controlled, and highly precise and stable oil pressure is fed from the hydraulic pump 4, even if there is a possibility that the recycle material is insufficiently filled into the cavity of the mold 13 due to the property of the recycle material, such insufficient filling (short shot failure or the like) is prevented, and even if there is a possibility that the recycle material is overfilled into the cavity of the mold 13 due to the property of the recycle material, overfilling (failure due to flash or the like) is prevented. Thus, in the second control mode M2, it is possible to perform optical control on recycle materials in particular and to satisfactorily perform molding even if 30% or more of different types of materials is included. After the injection process is completed, molding processes other than the injection process are performed (steps S8 and S9). In the molding processes other than the injection process, the second control mode M2 is cancelled.

Figure 8:
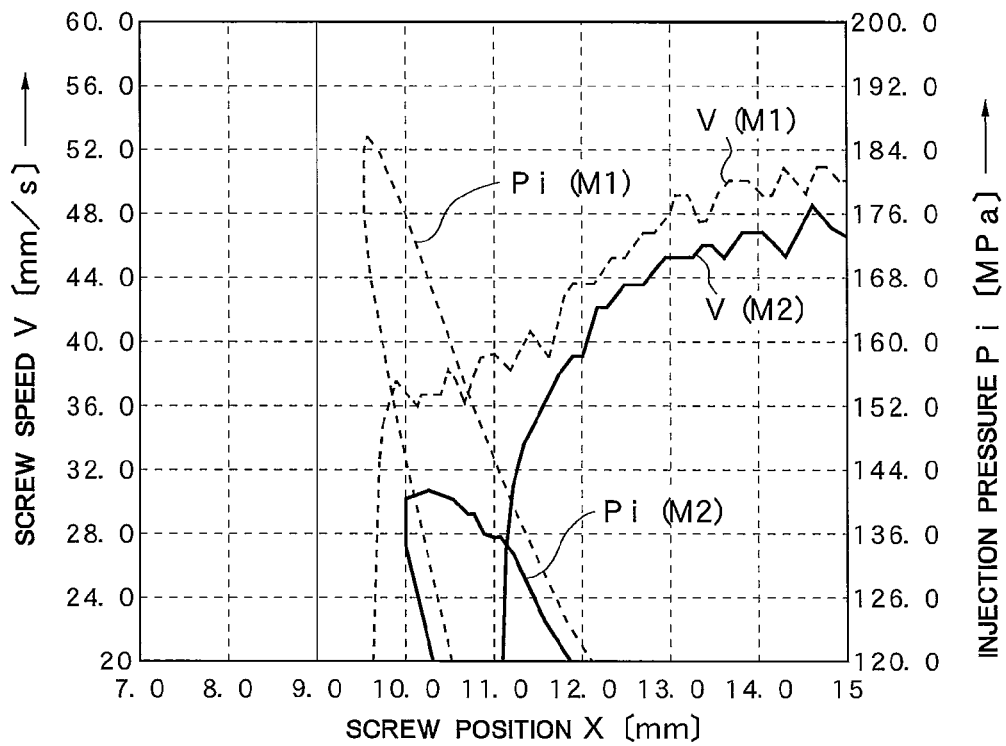
FIG. 8 shows data on screw speed and injection pressure with respect to the position of a screw in the last stage when the first and second control modes are used.
Figure 9:
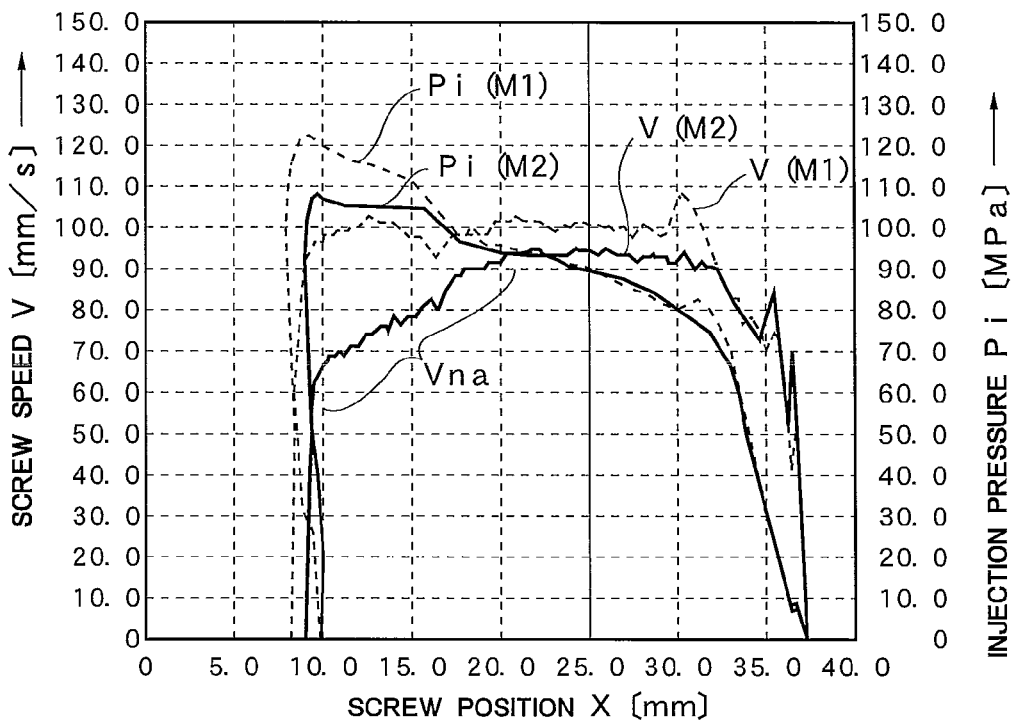
FIG. 9 shows data on screw speed and injection pressure with respect to the position of a screw in all stage of an injection filling process when the first and second control modes are used.

FIGS. 8 and 9 show comparison data between the first control mode M1 and the second control mode M2, especially, comparison data obtained when recycle materials are molded in the first control mode M1 and the second control mode M2. FIG. 8 shows a screw speed V and an injection pressure Pi corresponding to a screw position X at the end stage of an injection filling process. Since the end stage of the injection filling process is performed, the cavity of the mold 13 is almost completely filled with resin. In the first control mode M1, priority is given to speed control, and thus the speed control (V (M1) in FIG. 8) is continuously performed until a speed control region is finished (when the VP switching position is reached) at the end stage of the injection filling process. As a result of this, the injection pressure Pi (Pi (M1) in FIG. 8) increases according to the speed control. Therefore, a failure due to flash or the like is likely to occur. In contrast, in the second control mode M2, at the end of the injection filling process, the injection pressure Pi (Pi (M2) in FIG. 8) decreases according to the condition of the resin, and as the injection pressure Pi decreases, the screw speed V (V (M2) in FIG. 8) decreases. Therefore, the amount of filled resin is adjusted according to the condition of the resin and the magnitude of the stable pump pressure, with the result that a failure due to flash or the like is prevented.

FIG. 9 shows a screw speed V and an injection pressure Pi corresponding to a screw position X at all the stages of the injection filling process. In the second control mode M2, the injection pressure Pi (Pi (M2) in FIG. 9) is reduced according to the condition of the resin, and accordingly, the screw speed V (V (M2) in FIG. 9) gradually decreases. In particular, in FIG. 9, a period Vna refers to a period during which the screw speed V gradually decreases according to the injection pressure Pi (filling pressure), and, during this period, molding is performed according to the condition of the resin. In FIG. 9, V (M1) represents the screw speed V in the first control mode M1, and Pi (M1) represents the injection pressure Pi in the first control mode M1.

As described above, with the injection molding machine 1 according to this embodiment and the method of controlling it, since the first control mode M1 and second control mode M2 can be selected according to molding materials even if different types of molding materials (conditions) are used, it is possible to share a single injection molding machine 1 for molding operations for different types of molding materials. Thus, it is unnecessary to purchase two types of injection molding machines according to different types of molding materials, and this results in advantages in cost, installation space and the like, and the different types of molding materials are handled by change of the controlling methods. Hence, it is possible to prevent an injection molding machine itself from becoming specific and complicated, and this contributes to further reduction in cost. Since, even if molding materials contain different types of materials like recycle materials, optimum control is performed according to the property and condition of the molding materials that inevitably contain different types of materials, the molding quality and the evenness of the molding materials can be enhanced, even if the molding materials are uneven, irrespective of the degree of the unevenness. In particular, when the second control mode M2 is selected, overload is prevented. This contributes to improved energy saving in the injection molding machine as a whole.

Although the preferred embodiments have been described above in detail, the present invention is not limited to these embodiments. Modifications, additions and deletions are possible on the details of the circuit configuration, methods, values and the like without departing from the spirit of the invention.

For example, although the above description deals with the case where the manual selection means 8m that can be manually switched is used as the mode selection means 8, automatic selection means that automatically makes selection based on at least material codes input when molding conditions are set may be used instead. Although the above description deals with the case where the first control mode M1 or the second control mode M2 is selected according to material information, especially recycle materials that contain virgin materials and a predetermined proportion or more of waste materials, the present invention is not limited to such selection factors. In particular, selection can be arbitrarily made with the mode selection means 8 by the operator, and this allows selection to be made according to various molding materials, combinations of molding materials and the shape of molded products or the like or factors other than the molding materials, and when unknown molding materials are used, it is possible to first try one of the control modes M1 and M2 and then try, if molding is not satisfactorily performed, the other control mode M2 or M1. Although the servo motor 3 is used as the drive motor 3 by way of example, any other drive motor 3 having the same functions as the servo motor 3 may be used instead.

Industrial Applicability

The present invention is applicable to an injection molding machine provided with a hydraulic drive source incorporating a hydraulic pump that variably controls the number of rotations of a drive motor to achieve the control of a discharge flow rate.

Reference Signs List

1: Injection molding machine, 1i: Injection unit, 2: Hydraulic drive source, 3: Drive motor, 4: Hydraulic pump, 5: Screw speed detection means, 6: Injection pressure detection means, 6a: Nozzle resin pressure sensor, 6b: Cylinder internal sensor, 6c: Mold resin pressure sensor, 7: pump pressure sensor, 8: Mode selection means, 8m: Manual selection means, 11: Injection nozzle, 12: Injection cylinder, 13: Mold, 14: Rotary encoder, Vd: Position detection value, Vfc: Speed target value, Vsc: Speed target value, Pic: Pressure target value, Ppc: Pressure target value, Pid: Pressure detection value, Ppd: pressure detection value, M1: First control mode, M2: Second control mode, Cf: First control system, Cs: Second control system, Cm: Minor loop control system Citation List Patent Literature 1
JP-A-H04-79289
Patent Literature 2
JP-A-2004-50427

The invention claimed is:

1. An injection molding machine provided with a hydraulic drive source incorporating a hydraulic pump that variably controls the number of rotations of a drive motor to achieve control of a discharge flow rate, the injection molding machine comprising:

mode selection means that can selectively switch between a first control mode and a second control mode, wherein, in the first control mode, control is performed by a first control system in which a screw speed is controlled by feedback with a speed detection value that is detected by screw speed detection means and that is related to the screw speed and a speed target value that is set, and an injection pressure is controlled by feedback with a pressure detection value that is detected by injection pressure detection means and that is related to the injection pressure and a pressure target value that is set, whereas, in the second control mode, control is performed by a second control system in which the screw speed is open-loop controlled with a speed target value that is set, and a pump pressure is controlled by feedback with a pressure detection value that is detected by pump pressure detection means and that is related to the pump pressure of the hydraulic pump and a pressure target value that is set, wherein the injection molding machine is capable of operating in only one of the first and second control modes at any given time, wherein the first control mode is selected for a virgin material and the second control mode is selected for a recycled material.

2. The injection molding machine of claim 1, wherein a servo gain on the pump pressure in the second control mode is set lower than a servo gain on the pump pressure in the first control mode.

3. The injection molding machine of claim 1, wherein the injection pressure detection means includes a nozzle resin pressure sensor detecting a pressure of resin inside an injection nozzle in an injection device, a cylinder internal pressure sensor detecting a hydraulic pressure inside an injection cylinder, and a mold resin pressure sensor detecting a pressure of resin inside a mold.

4. The injection molding machine of claim 1, further comprising:
a minor loop control system for the drive motor that detects the number of rotations of the drive motor by a rotary encoder and that controls the number of rotations by feedback based on a result of the detection.

5. The injection molding machine of claim 4, wherein a servo motor is used as the drive motor.

6. The injection molding machine of claim 1, wherein manual selection means that can manually and arbitrarily perform switching is used as the mode selection means.

7. The injection molding machine of claim 1, wherein automatic selection means that automatically makes selection based on at least a material code input when molding conditions are set is used as the mode selection means.

8. The injection molding machine of claim 7, wherein the first control mode or the second control mode is selected according to at least material information.

9. An injection molding machine provided with a hydraulic drive source incorporating a hydraulic pump that variably controls the number of rotations of a drive motor to achieve control of a discharge flow rate, the injection molding machine comprising:
mode selection means that can selectively switch between a first control mode and a second control mode,
wherein, in the first control mode, control is performed by a first control system in which a screw speed is controlled by feedback with a speed detection value that is detected by screw speed detection means and that is related to the screw speed and a speed target value that is set, and an injection pressure is controlled by feedback with a pressure detection value that is detected by injection pressure detection means and that is related to the injection pressure and a pressure target value that is set,
whereas, in the second control mode, control is performed by a second control system in which the screw speed is open-loop controlled with a speed target value that is set, and a pump pressure is controlled by feedback with a pressure detection value that is detected by pump pressure detection means and that is related to the pump pressure of the hydraulic pump and a pressure target value that is set, wherein the first control mode or the second control mode is selected according to at least material information, and wherein the material information includes at least information of a recycle material containing a normal molding material (a virgin material) and a predetermined proportion or more of a waste material, and the first control mode is selected for the virgin material and the second control mode is selected for the recycle material.

10. An injection molding machine provided with a hydraulic drive source incorporating a hydraulic pump that variably controls the number of rotations of a drive motor to achieve control of a discharge flow rate, the injection molding machine comprising:
mode selection means that can selectively switch between a first control mode and a second control mode,
wherein, in the first control mode, control is performed by a first control system in which a screw speed is controlled by feedback with a speed detection value that is detected by screw speed detection means and that is related to the screw speed and a speed target value that is set, and an injection pressure is controlled by feedback with a pressure detection value that is detected by injection pressure detection means and that is related to the injection pressure and a pressure target value that is set,
whereas, in the second control mode, control is performed by a second control system in which the screw speed is open-loop controlled with a speed target value that is set, and a pump pressure is controlled by feedback with a pressure detection value that is detected by pump pressure detection means and that is related to the pump pressure of the hydraulic pump and a pressure target value that is set,
wherein the injection molding machine is capable of operating in only one of the first and second control modes at any given time,
wherein at least some operations performed by the first control system are performed only by the first control system, and at least some operations performed by the second control system are capable of being performed only by the second control system,
wherein the first control mode is selected for a virgin material and the second control mode is selected for a recycle material.

11. The injection molding machine of claim 1, wherein the hydraulic pump consists of a single hydraulic pump, and the drive motor consists of a single drive motor.

12. The injection molding machine of claim 9, wherein the injection pressure detection means includes:
a nozzle resin pressure sensor detecting a pressure of resin inside an injection nozzle in an injection device,
a cylinder internal pressure sensor detecting a hydraulic pressure inside an injection cylinder, and
a mold resin pressure sensor detecting a pressure of resin inside a mold.

13. The injection molding machine of claim 9, wherein the hydraulic pump consists of a single hydraulic pump, and the drive motor consists of a single drive motor.

14. The injection molding machine of claim 10, wherein the injection pressure detection means includes:
a nozzle resin pressure sensor detecting a pressure of resin inside an injection nozzle in an injection device,
a cylinder internal pressure sensor detecting a hydraulic pressure inside an injection cylinder, and
a mold resin pressure sensor detecting a pressure of resin inside a mold.

* * * * *